US012686495B2

(12) United States Patent
Eswaran et al.

(10) Patent No.: US 12,686,495 B2
(45) Date of Patent: Jul. 21, 2026

(54) TRANSFORMABLE CABIN ATTENDANT AIRCRAFT SEAT

(71) Applicant: AMI Industries, Inc., Colorado Springs, CO (US)

(72) Inventors: Archana Eswaran, Bangalore (IN); Narain Jayaprakash, Bangalore (IN); Chad R. Pacheco, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 163 days.

(21) Appl. No.: 18/753,379

(22) Filed: Jun. 25, 2024

(65) Prior Publication Data

US 2025/0136283 A1 May 1, 2025

(30) Foreign Application Priority Data

Nov. 1, 2023 (IN) .............................. 202311074545

(51) Int. Cl.
*B64D 11/06* (2006.01)

(52) U.S. Cl.
CPC ........ *B64D 11/0606* (2014.12); *B64D 11/064* (2014.12); *B64D 11/0641* (2014.12); *B64D 11/0691* (2014.12)

(58) Field of Classification Search
CPC .............. B64D 11/0606; B64D 11/064; B64D 11/0641; B64D 11/0691; A47C 7/66; A47C 7/666

(Continued)

(56) References Cited

U.S. PATENT DOCUMENTS 3,594,037 A * 7/1971 Sherman .................. A47C 7/56
297/14
4,093,305 A * 6/1978 Staroste ................ A47C 1/143
5/113
(Continued)

FOREIGN PATENT DOCUMENTS

DE 19607271 C2 * 7/1999 ............. A47C 7/666
DE 102006044408 A1 3/2008
(Continued)

OTHER PUBLICATIONS

European Search Report received in EP Application No. 24203314. 0, Nov. 26, 2024, 8 pages.

*Primary Examiner* — Milton Nelson, Jr.
(74) *Attorney, Agent, or Firm* — Suiter Swantz IP

(57) ABSTRACT
A transformable canopy assembly includes one or more canopy mounts configured to couple the transformable canopy to a frame of a seat. The transformable canopy includes a canopy sub-assembly configured to rotate between a stowed and a deployed position. The canopy sub-assembly includes a canopy configured to provide lighting or sound mitigation when in the deployed position. The canopy sub-assembly includes one or more canopy support members coupled to the canopy. The transformable canopy includes a canopy frame lock configured to couple the canopy sub-assembly to the frame. When in the stowed position, the canopy sub-assembly is secured to the frame via the canopy frame lock, where the canopy frame lock prevents the canopy sub-assembly from rotating to the deployed position. When in the deployed position, the canopy sub-assembly forms an arcuate-shaped cover over at least a portion of one of a seatback or a seat pan of the seat.

9 Claims, 7 Drawing Sheets

(58) Field of Classification Search
      USPC ................ 297/184.17, 184.15; 135/133, 132
      See application file for complete search history.

(56) References Cited

U.S. PATENT DOCUMENTS

| | | | |
|---|---|---|---|
| 5,511,259 | A | 4/1996 | Tarara |
| 5,795,018 | A * | 8/1998 | Schumacher .... B64D 11/00153 |
| | | | 297/217.3 |
| 6,095,172 | A | 8/2000 | Trapp et al. |
| 6,644,736 | B2 | 11/2003 | Nguyen et al. |
| 6,742,842 | B2 | 6/2004 | Dowty |
| 10,058,186 | B2 * | 8/2018 | Rivera ................... E04H 15/48 |
| 10,800,532 | B2 | 10/2020 | Hall, Jr. et al. |
| 10,875,653 | B2 | 12/2020 | Gill et al. |
| 2010/0045081 | A1 | 2/2010 | Efthimiou |
| 2012/0192905 | A1 | 8/2012 | Boss |
| 2016/0376007 | A1 | 12/2016 | Meindlhumer |
| 2017/0049238 | A1 | 2/2017 | Gilbert |
| 2023/0018063 | A1 | 1/2023 | Marutzky |
| 2023/0329442 | A1 * | 10/2023 | Cuff ...................... A47C 7/622 |

FOREIGN PATENT DOCUMENTS

| | | | |
|---|---|---|---|
| DE | 102007050139 | A1 | 4/2009 |
| EP | 3904209 | A1 | 11/2021 |
| JP | 2007105280 | A | 4/2007 |

* cited by examiner

100

100

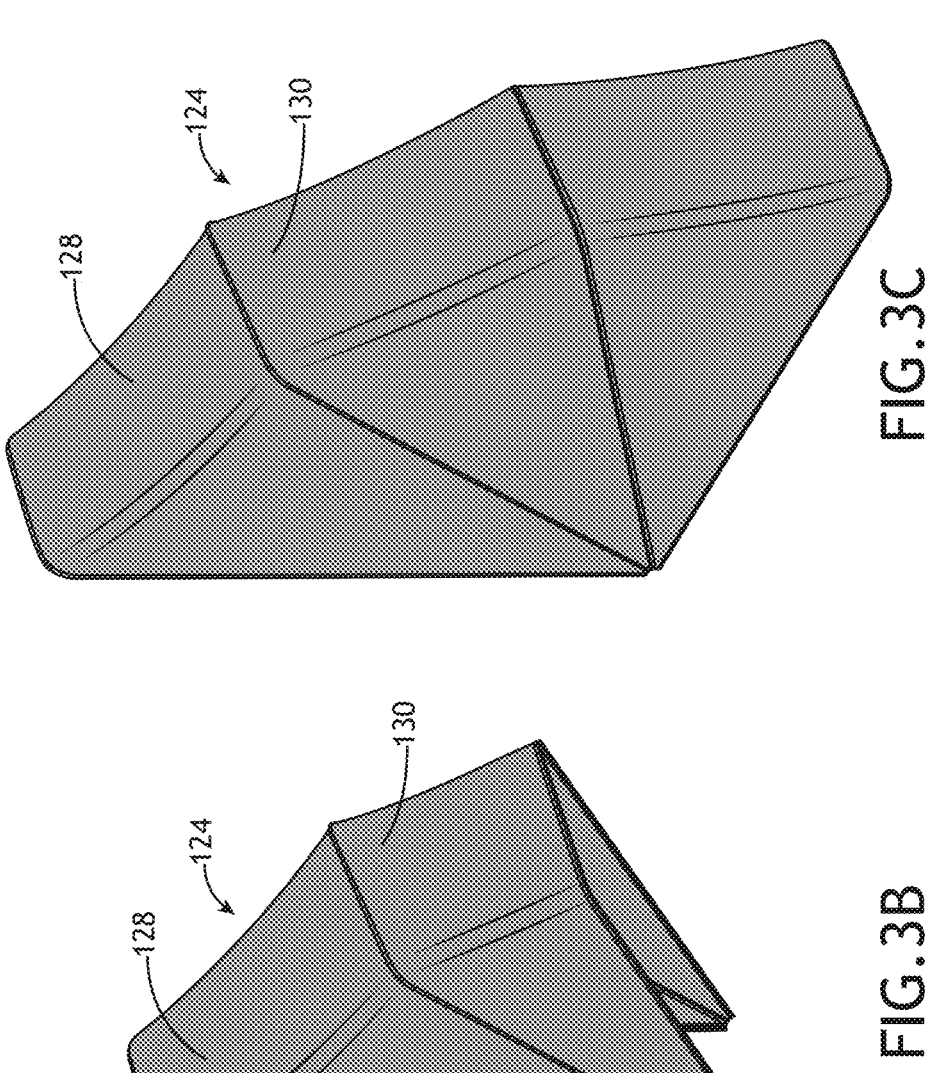
FIG.3C
FIG.3B
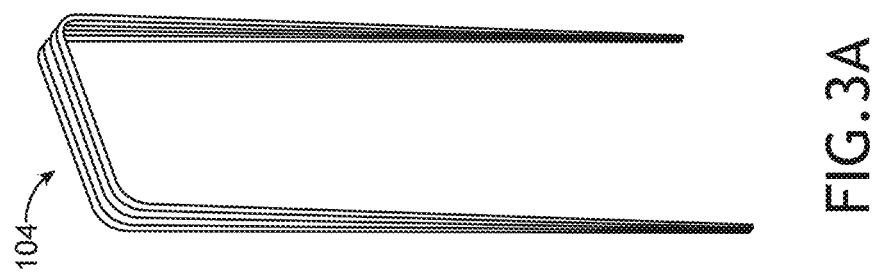
FIG.3A

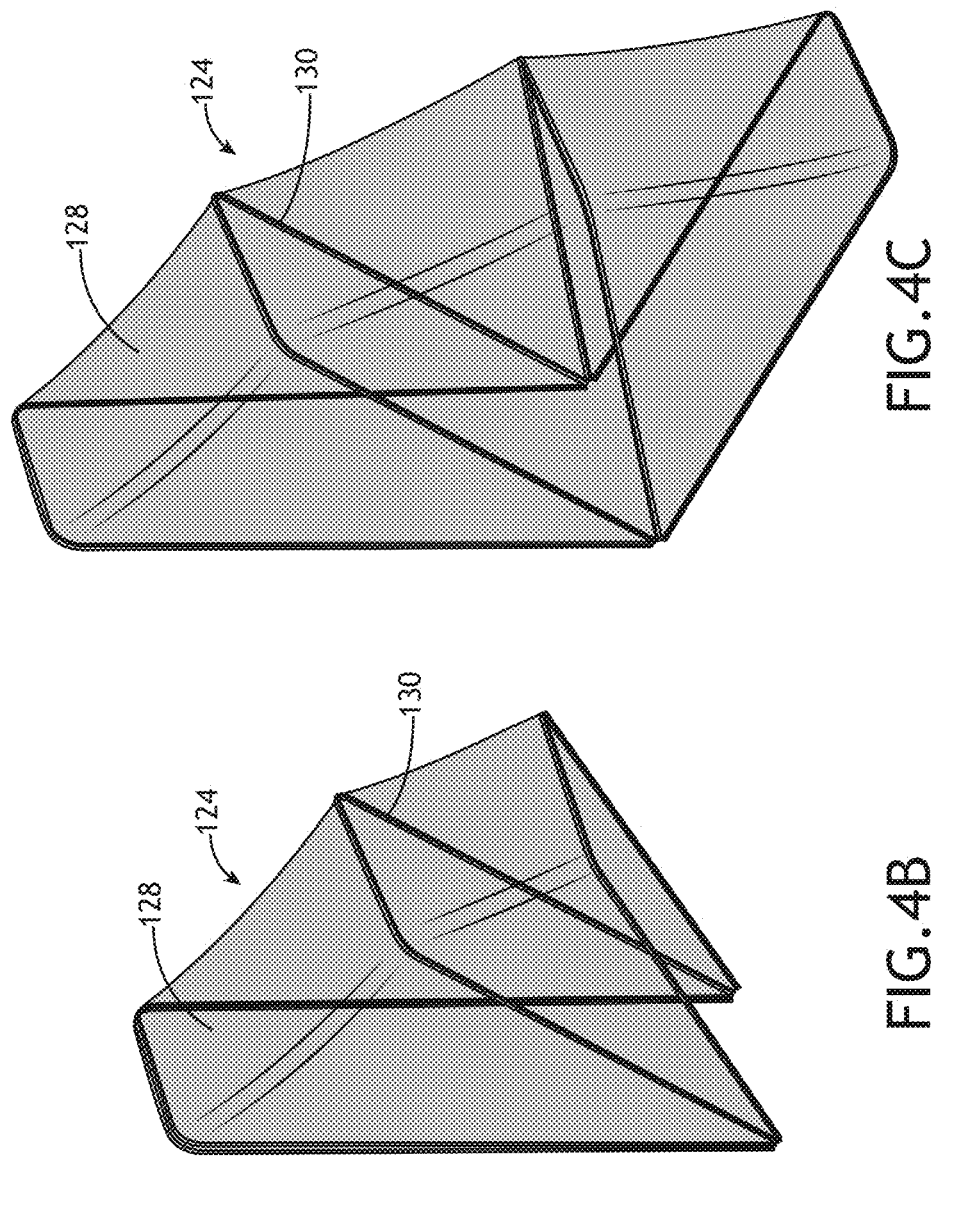
FIG. 4C
FIG. 4B
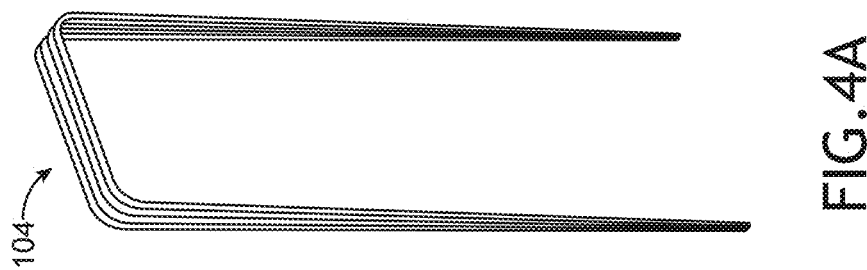
FIG. 4A

1

TRANSFORMABLE CABIN ATTENDANT AIRCRAFT SEAT

CROSS-REFERENCE TO RELATED APPLICATIONS

The present application claims the benefit of India Provisional Application No. 202311074545, filed Nov. 1, 2023, entitled TRANSFORMABLE CABIN ATTENDANT AIRCRAFT SEAT, naming Archana Eswaran, Nararin Jayaprakash, and Chad Pacheco as inventors, which is incorporated herein by reference in the entirety.

TECHNICAL FIELD

The subject matter disclosed herein relates to the field of aircraft seats and, in particular, to a transformable canopy for an aircraft seat.

BACKGROUND

Aircraft may include crew rest facilities for cabin attendants to use during rest periods. The crew rest facilities may need to be configured in accordance with aviation guidelines and/or standards. For example, the crew rest facilities should be separated from passenger seating areas by a minimum of a curtain, such that the cabin attendants have a dedicated area to use during rest periods.

SUMMARY

An aircraft seat is disclosed, in accordance with one or more embodiments of the disclosure. In embodiments, the aircraft seat includes a frame, where the frame includes a cavity defined by one or more surfaces of the frame. In embodiments, the aircraft seat includes a seatback coupled to a seatback cushion, where at least a portion of the seatback fits within the cavity of the frame. In embodiments, the aircraft seat includes a seat pan coupled to a seat pan cushion, where at least a portion of the seat pan fits within the cavity of the frame. In embodiments, the aircraft seat includes a transformable canopy assembly. In embodiments, the transformable canopy assembly includes one or more canopy mounts configured to couple the transformable canopy assembly to the frame. In embodiments, the transformable canopy assembly includes a canopy sub-assembly configured to rotate between one of a stowed position and a deployed position. In embodiments, the canopy sub-assembly includes a canopy configured to provide one of lighting or sound mitigation when in the deployed position. In embodiments, the canopy sub-assembly one or more canopy support members configured to support the canopy, where the one or more canopy support members are coupled to the canopy. In embodiments, the transformable canopy assembly includes a canopy frame lock configured to couple the canopy sub-assembly to the frame. In embodiments, when in the stowed position, the canopy sub-assembly is secured to the frame via the canopy frame lock, wherein the canopy frame lock prevents the canopy sub-assembly from rotating to the deployed position. In embodiments, when in the deployed position, the canopy sub-assembly forms an arcuate-shaped cover over at least a portion of one of the seatback or the seat pan.

In some embodiments, the arcuate-shaped cover formed by the canopy sub-assembly may cover the seatback and the seat pan, where a user occupying the aircraft seat may be entirely covered by the arcuate-shaped cover formed by the canopy sub-assembly.

In some embodiments, the arcuate-shaped cover of the canopy sub-assembly may cover the seatback, where a user occupying the aircraft seat may be at least partially covered by the arcuate-shaped cover formed by the canopy sub-assembly.

In some embodiments, the one or more canopy mounts may include at least one of one or more friction hinges or one or more torsion springs.

In some embodiments, the canopy frame lock may include at least one of one or more hook-and-loop fasteners, one or more solenoid locks, or one or more slide locks.

In some embodiments, the canopy sub-assembly may further include one or more canopy handles.

In some embodiments, the one or more canopy handles may be coupled to the one or more canopy support members and may be arranged on an interior surface of the canopy sub-assembly.

In some embodiments, the aircraft seat may further include a leg rest with foot support assembly configured to couple to a portion of the seat pan.

In some embodiments, the aircraft seat may be actuatable between one of an upright and lie-flat position.

A transformable canopy assembly for a seat is disclosed, in accordance with one or more embodiments of the disclosure.

In embodiments, the transformable canopy assembly includes one or more canopy mounts configured to couple the transformable canopy assembly to a frame of the seat. In embodiments, the transformable canopy assembly includes a canopy sub-assembly configured to rotate between one of a stowed position and a deployed position. In embodiments, the canopy sub-assembly includes a canopy configured to provide one of lighting or sound mitigation when in the deployed position. In embodiments, the canopy sub-assembly includes one or more canopy support members configured to support the canopy, where the one or more canopy support members are coupled to the canopy. In embodiments, the transformable canopy assembly includes a canopy frame lock configured to couple the canopy sub-assembly to the frame. In embodiments, when in the stowed position, the canopy sub-assembly is secured to the frame via the canopy frame lock, where the canopy frame lock prevents the canopy sub-assembly from rotating to the deployed position. In embodiments, when in the deployed position, the canopy sub-assembly forms an arcuate-shaped cover over at least a portion of one of a seatback or a seat pan of the seat.

In some embodiments, the seat may include a cabin attendant aircraft seat.

In some embodiments, the arcuate-shaped cover formed by the canopy sub-assembly may cover the seatback and the seat pan, where a user occupying the aircraft seat may be entirely covered by the arcuate-shaped cover formed by the canopy sub-assembly.

In some embodiments, the one or more canopy mounts may include at least one of one or more friction hinges or one or more torsion springs.

In some embodiments, the canopy frame lock may include at least one of one or more hook-and-loop fasteners, one or more solenoid locks, or one or more slide locks.

In some embodiments, the canopy sub-assembly may further include one or more canopy handles, where the one or more canopy handles may be coupled to the one or more canopy support members and arranged on an interior surface of the canopy sub-assembly.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3A illustrates a perspective view of a transformable canopy assembly in a stowed position, in accordance with one or more embodiments of the disclosure.

FIG. 3B illustrates a perspective view of a transformable canopy assembly in an intermediate position, in accordance with one or more embodiments of the disclosure.

FIG. 3C illustrates a perspective view of a transformable canopy assembly in a deployed position, in accordance with one or more embodiments of the disclosure.

FIG. 4A illustrates a perspective view of a transformable canopy assembly in a stowed position, in accordance with one or more embodiments of the disclosure.

FIG. 4B illustrates a perspective view of a transformable canopy assembly in an intermediate position, in accordance with one or more embodiments of the disclosure.

FIG. 4C illustrates a perspective view of a transformable canopy assembly in a deployed position, in accordance with one or more embodiments of the disclosure.

DETAILED DESCRIPTION OF THE INVENTION

Figure 1A:
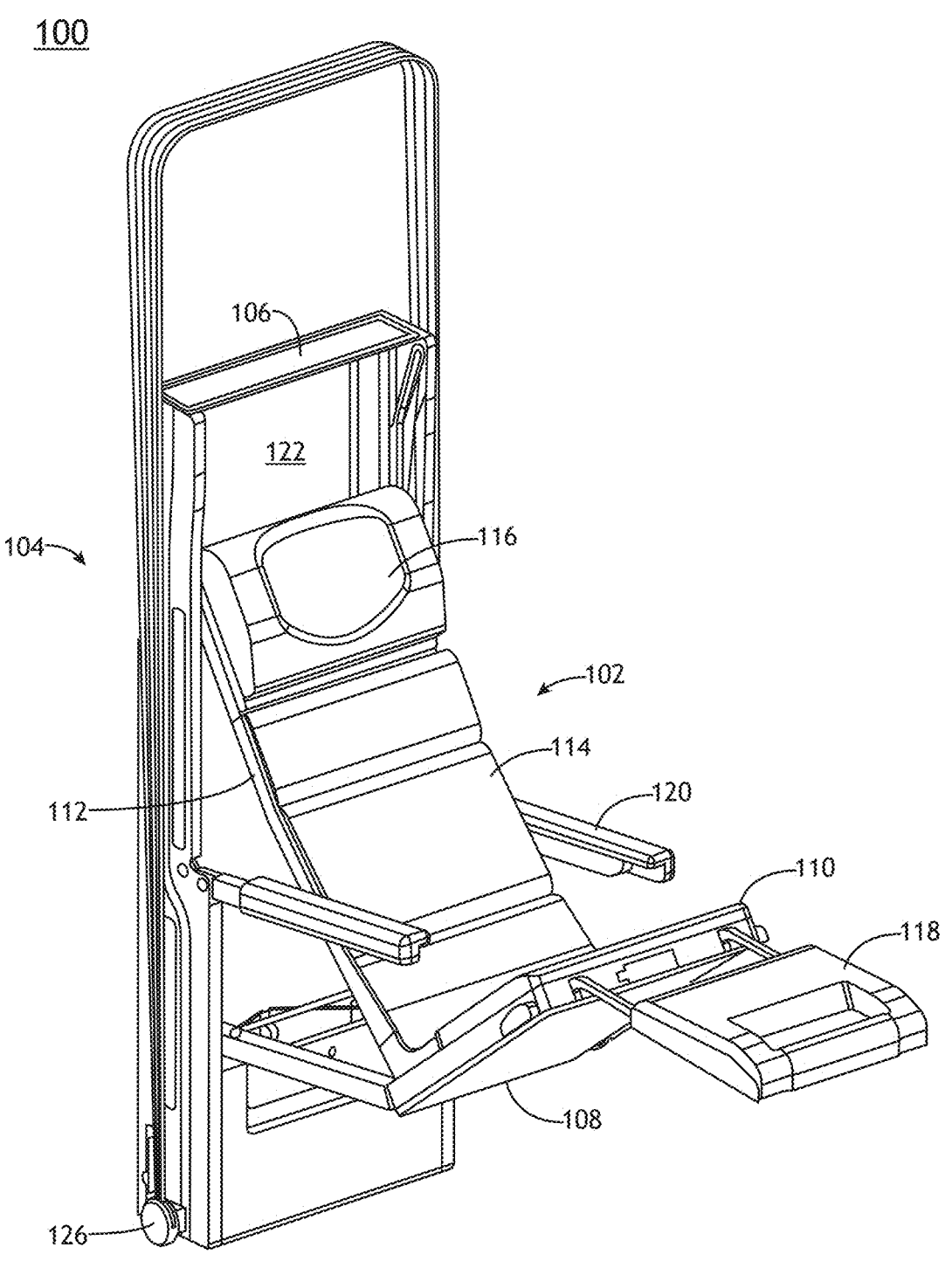
FIG. 1A illustrates a perspective view of a cabin attendant aircraft seat including a transformable canopy assembly in a stowed position, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-4C in general illustrate a transformable canopy assembly for a cabin attendant aircraft seat, in accordance with one or more embodiments of the disclosure.

Aircraft may include crew rest facilities for cabin attendants to use during rest periods. The crew rest facilities may need to be configured in accordance with aviation guidelines and/or standards put forth by, but not limited to, the Federal Aviation Administration (FAA), the European Aviation Safety Agency (EASA) or any other flight certification agency or organization; or any other guidelines agency or organization; or the like. For example, Class 2 rest facilities according to 14 CFR § 117.3, should be separated from passengers by a minimum of curtain to provide darkness and some sound mitigation and should include a cabin attendant seat that allows for a flat or near flat sleep position.

As such, it would be desirable to provide a transformable canopy assembly for a cabin attendant aircraft seat. The transformable canopy assembly should be configured to transform between a stowed position and a deployed position. For example, when in the deployed position, the transformable canopy assembly may provide a rest area with
darkening and sound mitigation. When a crew member no
longer needs to utilize the rest area, the transformable
canopy assembly may be transformed to the stowed posi-
tion. In this regard, the transformable canopy assembly may
minimize the effort to convert multiple crew rest locations,
instead of having large curtains to be installed. The trans-
formable canopy assembly should be integrated with a cabin
attendant aircraft seat configured to allow for a flat or near
flat sleep position. In this regard, the privacy system of the
transformable canopy assembly is integrated with the cabin
crew rest seat to provide space-saving benefits. The trans-
formable canopy assembly for a cabin attendant aircraft seat
should be configured in accordance with aviation guidelines
and/or standards.

FIGS. 1A-4C illustrate perspective views of a crew rest
facility system 100 including a cabin attendant seat 102 and
a transformable canopy assembly 104, in accordance with
one or more embodiments of the disclosure.

Cabin attendant aircraft seats are generally discussed in
U.S. Patent Publication No. 20230018063, published on Jan.
19, 2023, which is incorporated herein by reference in the
entirety.

The cabin attendant seat 102 may include a frame 106.
The frame 106 may be couplable to an interior structure in
an aircraft cabin. The frame 106 may be couplable to a floor
in the aircraft cabin. It is contemplated that, in some embodi-
ments, the frame 106 may be separate from the cabin
attendant seat 102. For example, the frame 106 and the cabin
attendant seat 102 may be arranged proximate to each other,
where the frame 106 may be integrated with one or more
monuments (or portions of the aircraft cabin).

The cabin attendant seat 102 may be a single-occupant
seat or a double-occupant seat. The cabin attendant seat 102
may include, but is not limited to, a seat pan 108, seat pan
cushion 110, a seatback 112, a seatback cushion 114, a head
rest 116, a leg rest member 118, and one or more armrests
120. The one or more armrests 120 may be actuatable
between a stowed position and a deployed position.

The leg rest member 118 may include a foot support
assembly configured to couple to a portion of the seat pan
108.

At least a portion of the cabin attendant seat 102 may fit
within a cavity 122 of the frame 106. For example, the
seatback 112, the seatback cushion 114 and a portion of the
seat pan 108 and seat pan cushion 110 may fit within the
cavity 122 of the frame 106. It is noted, however, that
additional portions or the entire cabin attendant seat 102
may fit within the cavity 122 of the frame 106.

The cabin attendant seat 102 may be rotatable about an
axis (e.g., swivelable) or translatable (e.g., trackable or
slidable). The cabin attendant seat 102 may be rotatable
about an axis crosswise in the cabin attendant seat 102 into
a position including, but not limited to, a stowed position or
one or more deployed positions. The cabin attendant seat
102 may be fully positionable between the outer limits of
motion as defined by the moveable components of the cabin
attendant seat 102. Where the cabin attendant seat 102 is
installed within an aisle, a walkway, a galley, and/or an
entrance to/egress from the aircraft, the cabin attendant seat
102 may be fully positionable between the outer limits of
motion as defined by surrounding interior structures within
the aisle, the walkway, the galley, and/or the entrance
to/egress from the aircraft. It is noted an upright or raised
position may be considered a taxi, takeoff, or landing (TTL)
position during select stages of flight (though the upright or
raised position is not limited to use during the select stages of flight as the TTL position, but also may be used at any
point during the flight), for purposes of the present disclo-
sure. In addition, it is noted herein that any position that does
not meet the above-defined requirements of the TTL position
may be considered a non-TTL position, for purposes of the
present disclosure. Further, it is noted the cabin attendant
seat 102 may be actuatable (e.g., translatable and/or rotat-
able) from the TTL position to a non-TTL position, and/or
vice versa. Further, it is noted the cabin attendant seat 102
may be capable of a fully upright or raised position, and that
the TTL position may have a more reclined seatback cushion
and a more angled upward seat pan cushion as compared to
the fully upright or raised position. Therefore, the above
description should not be interpreted as a limitation on the
present disclosure but merely an illustration.

In general, the cabin attendant seat 102 may be translat-
able (e.g., trackable or slidable). The cabin attendant seat
102 may be rotatable about an axis crosswise through the
cabin attendant seat 102 into a position including, but not
limited to, the upright or raised position, one or more lounge
or reclined positions, and a lie-flat or bed position. For
example, the cabin attendant seat 102 may transition directly
between the upright or raised position and the lie-flat or bed
position. By way of another example, it is noted the cabin
attendant seat 102 may transition through one or more
lounge or reclined positions between the upright or raised
position and the lie-flat or bed position. By way of another
example, the cabin attendant seat 102 may transition into
one or more lounge or reclined positions in a motion
separate from the transition between the upright or raised
position and the lie-flat or bed position. Therefore, the above
description should not be interpreted as a limitation on the
scope of the disclosure but merely an illustration.

Figure 1B:
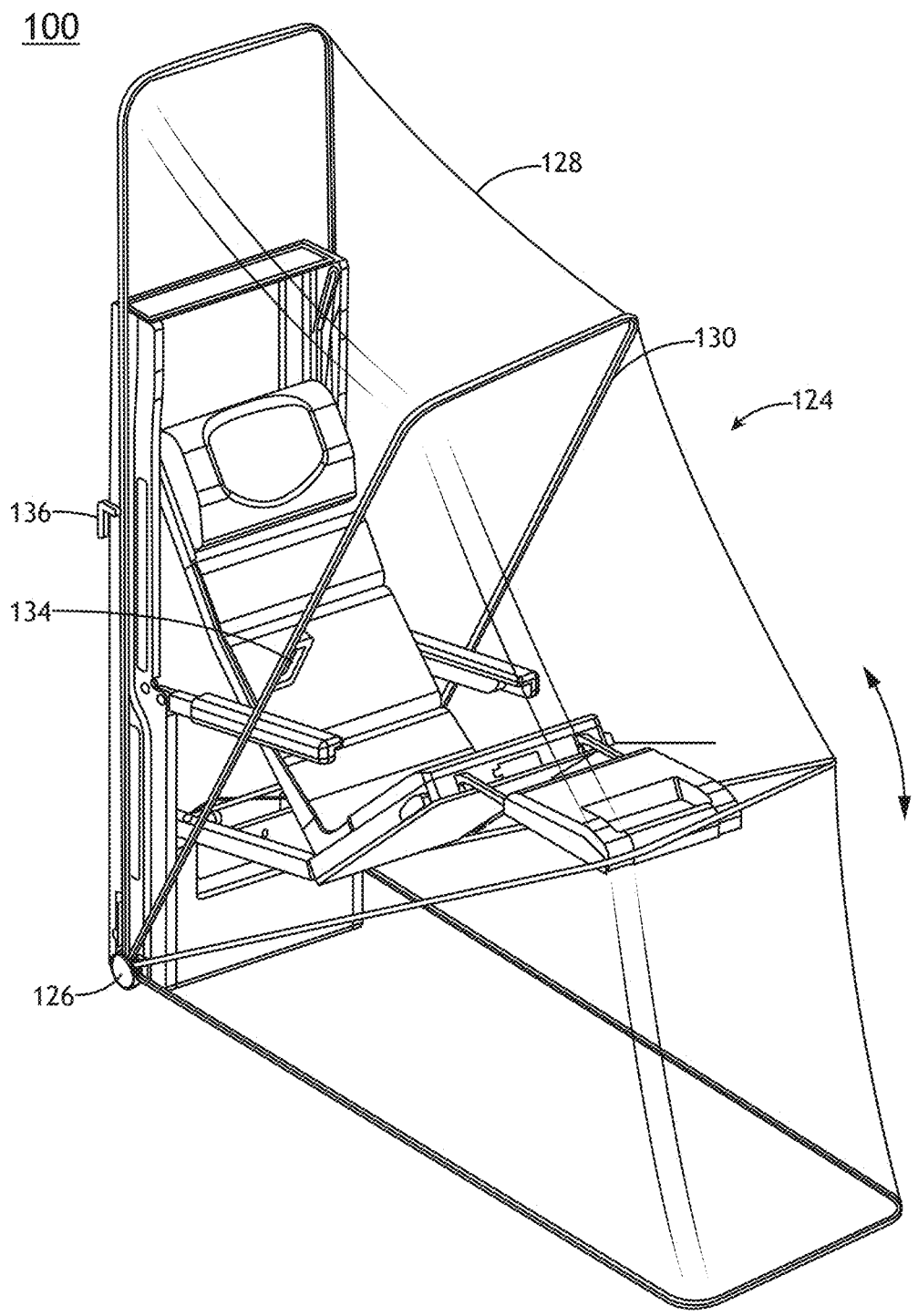
FIG. 1B illustrates a perspective view of a cabin attendant aircraft seat including the transformable canopy assembly in a deployed position, in accordance with one or more embodiments of the disclosure.
Figure 1C:
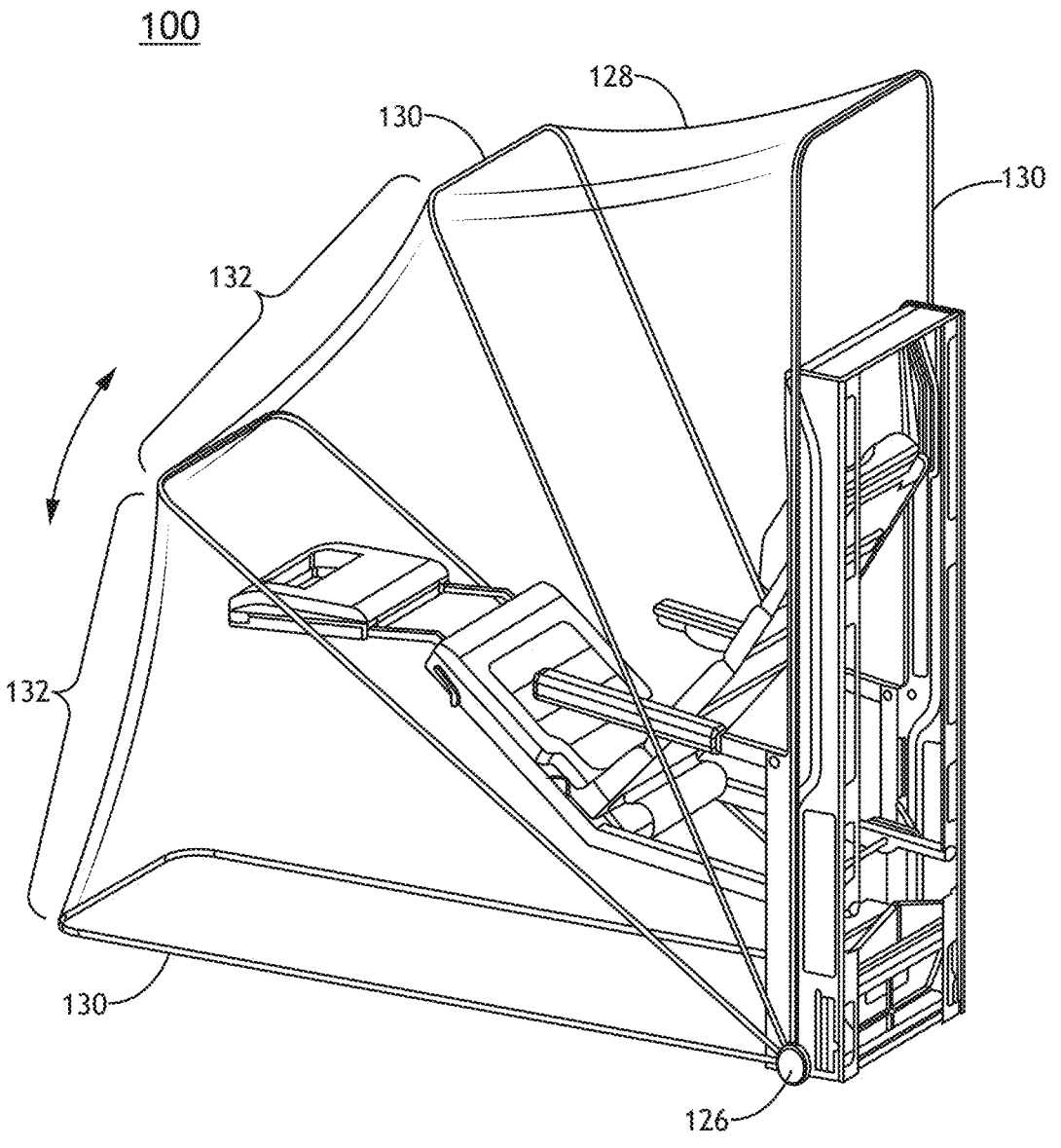
FIG. 1C illustrates a perspective view of a cabin attendant aircraft seat including the transformable canopy assembly in the deployed position, in accordance with one or more embodiments of the disclosure.
Figure 1D:
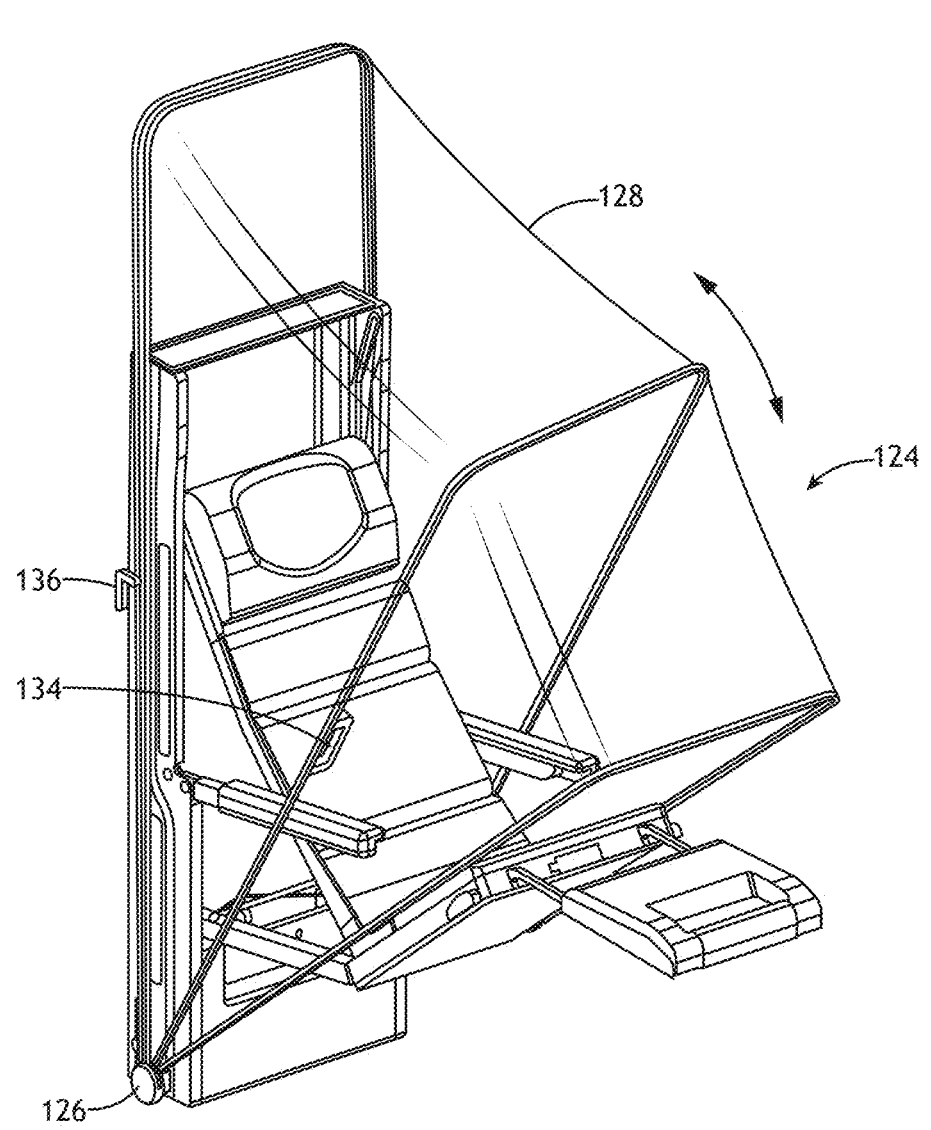
FIG. 1D illustrates a perspective view of a cabin attendant aircraft seat including the transformable canopy assembly in an intermediate position, in accordance with one or more embodiments of the disclosure.
Figure 2:
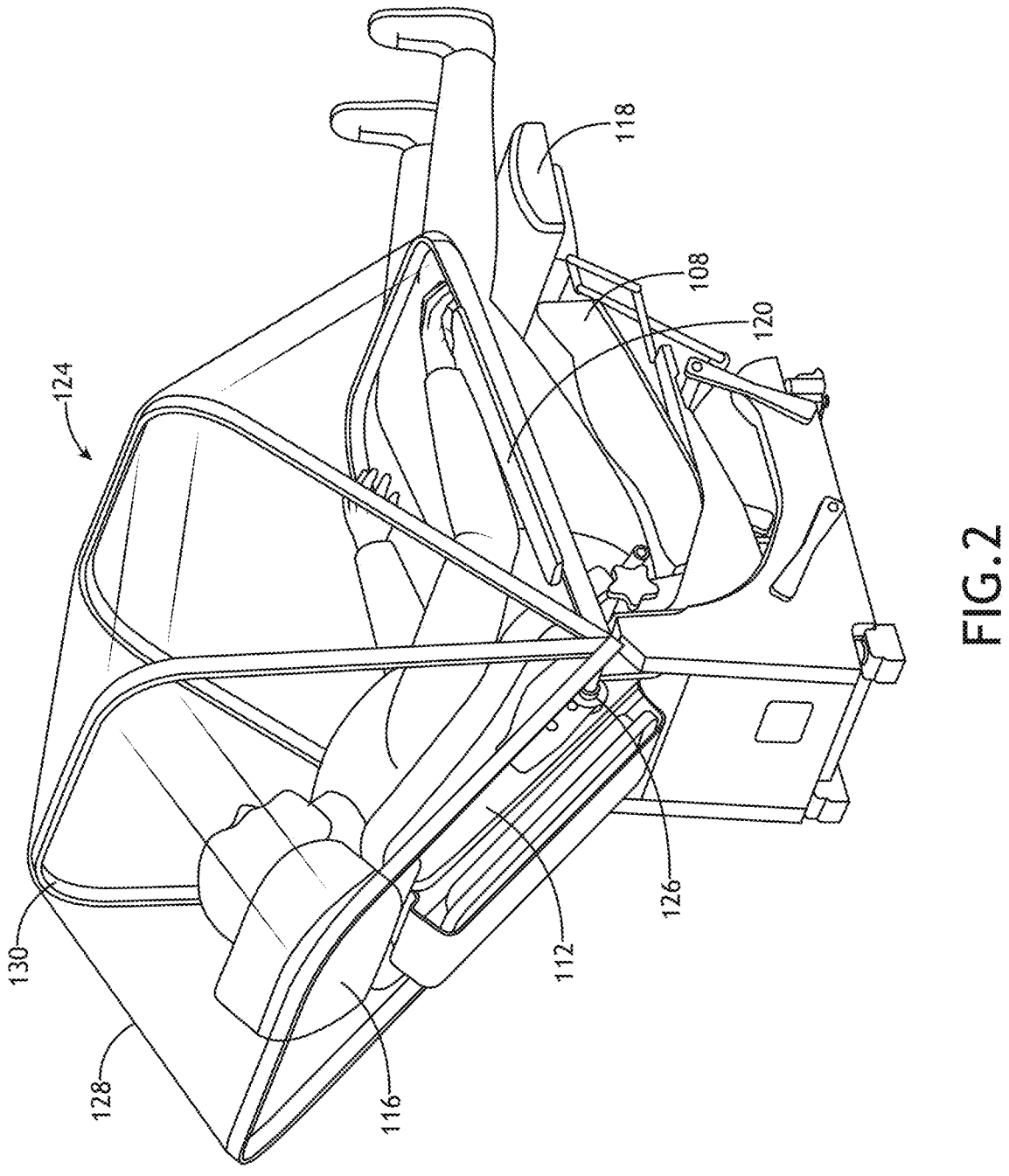
FIG. 2 illustrates a perspective view of a cabin attendant aircraft seat including a transformable canopy assembly in a deployed position, in accordance with one or more embodiments of the disclosure.

Although not shown in FIGS. 1A-2, the frame 106 may
include a storage compartment. The one or more storage
compartments may be configured to receive and hold medi-
cal supplies, medical devices, medical tools, or the like. The
one or more storage compartments may include one or more
safety devices (e.g., air masks, personal floatation devices,
or the like). The one or more storage compartments may
include a storage compartment configured to receive lug-
gage or other belongings of the cabin attendant. The one or
more storage compartments may be configured to receive
and hold (e.g., contain, secure, or the like) one or more
passenger amenities including, but not limited to, paper-
printed materials (e.g., magazines, newspapers, pamphlets,
or the like), select personal electronic devices (e.g., phones,
tablets, phablets, laptops, music devices, digital video disc
(DVD) players, handheld gaming consoles or devices, or the
like), food products, drink products, bassinets, blankets, or
the like. The one or more storage compartments may include
one or more electronic connections for one or more passen-
ger amenities such as, but not limited to, one or more
charging ports, one or more charging cables, or the like. The
one or more storage compartments may include one or more
electronic connections in communication with one or more
components of the suite such as, but not limited to, one or
more display device connection ports, one or more display
device connection cables, one or more audio output jacks
(e.g., headphone jacks), one or more audio input jacks, or the
like.

The transformable canopy assembly 104 may integrate
with the cabin attendant seat 102. For example, the trans-
formable canopy assembly 104 may couple to one or more
portions of the cabin attendant seat 102. For instance, as
shown in FIGS. 1A-1D, the transformable canopy assembly
104 may couple to one or more portions of the frame 106 of the cabin attendant seat 102 via one or more canopy mounts 126. By way of another example, the transformable canopy assembly 104 may couple to one or more portions surrounding the cabin attendant seat 102. For instance, the transformable canopy assembly 104 may couple to the floor of the aircraft cabin that is proximate to the cabin attendant seat 102.

The transformable canopy assembly 104 may include a canopy sub-assembly 124. For example, the canopy sub-assembly 124 may be configured to couple to the frame 106 of the cabin attendant seat 102 via the one or more canopy mounts 126. In one non-limiting example, as shown in FIGS. 1A-1D, the one or more canopy mounts 126 may be configured to couple to one or more bottom portions of the frame 106 of the cabin attendant seat 102. For instance, the frame 106 of the cabin attendant seat 102 may be coupled to a first canopy mount 126 and a second canopy mount 126 where the frame 106 of the cabin attendant seat 102 couples to a floor of the aircraft cabin. In this regard, when the canopy sub-assembly 124 is deployed, the canopy sub-assembly 124 may cover the entire cabin attendant seat 102 and thus the cabin attendant occupying the cabin attendant seat 102.

By way of another example, the canopy sub-assembly 124 may be configured to directly couple to the seat back 112 or seat pan 108 of the cabin attendant seat 102. In a non-limiting example, as shown in FIG. 2, the one or more canopy mounts 126 may be configured to couple to the seatback 112 of the cabin attendant seat 102. In this regard, when the canopy sub-assembly 124 is deployed, the canopy sub-assembly 124 may cover a portion of the attendant seat 102 (e.g., top half) and thus a portion of the cabin attendant occupying the cabin attendant seat 102 (e.g., upper body).

As will be discussed further herein, the transformable canopy assembly 104 may be configured to rotate between one of a stowed position and a deployed position, as well as, one or more positioned between the stowed/deployed position (e.g., intermediate positions, as shown in FIGS. 1D, 3B, 4B). For example, the transformable canopy assembly 104 may be configured to rotate about an axis of the one or more canopy mounts 126. When in the deployed position, as shown in FIGS. 3C and 4C, the transformable canopy assembly 104 defines a generally arch-shaped cover (e.g., arcuate-shaped cover) over the cabin attendant seat 102 (or at least a portion of the cabin attendant seat 102). In this regard, when in the deployed position, the transformable canopy assembly 104 provides privacy (e.g., light and sound mitigation) for the crew member, in accordance with aviation guidelines and/or standards (e.g., 37 CFR § 117.3).

The one or more canopy mounts 126 may include any suitable mount for coupling the transformable canopy assembly 104 and the cabin attendant seat 102. For example, the one or more canopy mounts 126 may include one or more friction hinges. By way of another example, the one or more canopy mounts 126 may include one or more torsion springs. In this regard, the one or more torsion springs may be used to counterbalance the weight of the canopy sub-assembly 124 when rotating about the axis between one of the stowed or deployed positions.

The canopy sub-assembly 124 may include a canopy 128 and one or more canopy support members 130 (or frame members). For example, the canopy 128 may be configured to couple to (or be integrated with) the one or more canopy support members 130. For instance, the one or more canopy support members 130 may be configured to support the canopy 128. In this regard, when the transformable canopy assembly 104 is in the deployed position, the canopy 128 and the one or more canopy support members 130 may form a generally arch shaped cover (e.g., arcuate-shaped cover) over the cabin attendant seat 102.

The canopy 128 and the one or more canopy support members 130, when coupled together (or integrated together), may form one or more rotatable canopy sections 132. For example, the respective rotatable canopy sections 132 may be individually rotatable between one of the stowed position or deployed position. In this regard, as shown in FIGS. 1D, 3B, 4B, the respective rotatable canopy sections 132 may be individually rotatable based on the configuration of the cabin attendant seat 102 (or aircraft cabin) and/or preferences of the cabin attendant (e.g., to allow partial privacy/darkening, or the like).

Although FIGS. 1B-1D depict the one or more canopy support members 130 coupled to an interior surface of the canopy 128, such that they are placed inside the canopy sub-assembly 124, it is contemplated that the one or more canopy support members 130 may be arranged in any configuration. For example, the one or more canopy support members 130 may be arranged on an exterior surface of the canopy 128, such that they are placed on the exterior of the canopy sub-assembly 124. Further, the one or more canopy support members 130 may be hidden within pockets of the canopy 128, where the canopy 128 includes pockets configured to house the one or more support members.

The canopy sub-assembly 124 may include one or more canopy handles 134. For example, as shown in FIG. 1B, the one or more canopy handles 134 may be coupled to the one or more support members 130. For instance, the one or more canopy handles 134 may be coupled to an interior surface of the one or more support members 130, such that the one or more canopy handles 134 are inside the canopy 128. In this regard, the one or more canopy handles 134 may be accessible to an occupant of the cabin attendant seat 102 when inside the canopy sub-assembly 124, such that the occupant may rotate the canopy sub-assembly 124 between one of the stowed or deployed position via the one or more canopy handles 134 inside the canopy sub-assembly 124. Although FIG. 1B depicts the one or more canopy handles 134 arranged in a specific location within the canopy sub-assembly 124, it is contemplated that the one or more canopy handles 134 may be coupled to any portion (or integrated within any portion) of the canopy sub-assembly 124 or cabin attendant seat 102. For example, the one or more canopy handles 134 may be integrated with a portion of the canopy 128 (e.g., inside or outside the canopy 128). By way of another example, the one or more canopy handles 134 may be coupled to (or integrated with) an exterior surface of the one or more support members 130.

The canopy 128 may be formed of any suitable material for providing light and sound mitigation such as, but not limited to, cotton, polyester, linen, nylon, silk, rayon, a combination thereof, or the like.

It is contemplated that the canopy 128 may be opaque, semi-transparent, or provide one-way visibility (e.g., occupant can see out, but passengers cannot see in), as shown in FIGS. 3A-3C and FIGS. 4A-4C.

In some embodiments, the canopy 128 may include one or more access openings (e.g., transparent sections, semi-transparent sections, openings, or the like). For example, the one or more access openings may provide access, such that when the transformable canopy assembly 104 is in the deployed position, the canopy sub-assembly 124 may be accessed. In this regard, the one or more access openings may allow for additional light or air flow into the canopy sub-assembly 124 when in the deployed position.

The one or more access openings may include one or more access flaps (or doors). The one or more access flaps may be coupled to the canopy sub-assembly 124 via any suitable fastening mechanism such as, but not limited to, one or more zippers, one or more snaps (or buttons), one or more hook-and-loop fasteners, one or more magnets, or the like.

In some embodiments, the canopy sub-assembly 124 includes (or is coupled to) one or more ventilation members. For example, the canopy sub-assembly 124 may include an air flow pump to provide ventilation to the canopy sub-assembly 124.

In some embodiments, one of the canopy sub-assembly 124 or the cabin attendant seat 102 includes one or more lighting devices. For example, the one or more armrests 120 may include one or more lighting devices configured to illuminate a portion of the canopy sub-assembly 124.

The transformable canopy assembly 104 may include a canopy frame lock 136. For example, the canopy frame lock 136 may be configured to lock the canopy sub-assembly 124 in the stowed position. For instance, the canopy frame lock 136 may be configured to secure the canopy sub-assembly 124 to the frame 106 when in the stowed position. In this regard, when the transformable canopy assembly 104 is not in use, the canopy sub-assembly 124 may be secured to the frame 106 via the canopy frame lock 136, such that the canopy frame lock 136 prevents the canopy sub-assembly 124 from rotating to the deployed position.

The canopy frame lock 136 may include any suitable lock device. For example, the canopy frame lock 136 may include one or more hook-and-loop fasteners. For instance, the canopy sub-assembly 124 may be secured to the frame 106 via one or more adjustable ties including one or more hook-and-loop fasteners, where the one or more adjustable ties may be configured to secure the canopy sub-assembly 124 in the stowed position. By way of another example, the canopy frame lock 136 may include one or more solenoid operated locks. For instance, the cabin attendant seat 102 may include one or more sensors (e.g., in the seat pan, seatback, or the like), where the one or more sensors may be configured to detect occupancy of the cabin attendant seat 102 and cause the solenoid operated lock to unlock. In this regard, when occupancy of the cabin attendant seat 102 is detected, the solenoid operated lock may unlock to allow the canopy sub-assembly 124 to be deployed. When the cabin attendant seat 102 is unoccupied, the solenoid operated lock may ensure that the canopy sub-assembly 124 is secured in the stowed position. By way of another example, the canopy frame lock 136 may include one or more sliding locks. For instance, the canopy sub-assembly 124 may be secured to the frame 106 via one or more sliding locks, where the sliding locks may be configured to secure the canopy sub-assembly 124 in the stowed position. When the canopy sub-assembly 124 is to be deployed, a user may apply an amount of force upon the one or more sliding locks to cause the one or more sliding locks to disengage the canopy sub-assembly 124 from the frame 106.

In some embodiments, the canopy sub-assembly 124 includes a canopy actuation device. For example, the canopy sub-assembly 124 may be coupled to a canopy actuation device configured to actuate the canopy sub-assembly 124 between one of the stowed or deployed positions. In a non-limiting example, the one or more armrest 120 may include an actuation control panel, such that an occupant may be configured to actuate the canopy sub-assembly 124 between one of the stowed or deployed positions via the actuation control panel. The actuation control panel may be coupled to an actuator of the canopy sub-assembly 124 to cause the actuator to actuate the canopy sub-assembly 124 between one of the stowed or deployed positions.

It is noted that the one or more actuators may include any suitable type of actuator. For example, the one or more actuators may include, but are not limited to, one or more electro-mechanical actuators, gas spring actuators, linear/rotary actuators, or the like.

Although FIGS. 1A-3 illustrate the transformable canopy assembly 104 in one or more positions, the transformable canopy assembly 104 may be configured to assume an infinite number of positions between the stowed position and fully deployed position.

Although embodiments of the disclosure illustrate the transformable canopy assembly 104 being used with a cabin attendant aircraft seat 102 installed within an aircraft cabin, it is noted herein, the transformable canopy assembly 104 and/or components of the transformable canopy assembly 104 are not limited to the aviation environment and/or the aircraft components within the aviation environment. For example, the transformable canopy assembly 104 and/or components of the transformable canopy assembly 104 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the transformable canopy assembly 104 and/or components of the transformable canopy assembly 104 may be configured for commercial or industrial use in either a home or a business. Therefore, the above description should not be interpreted as a limitation on the present disclosure but merely an illustration.

Further, it is noted herein, the transformable canopy assembly 104 and/or components of the transformable canopy assembly 104 are not limited to being used with a cabin attendant aircraft seat 102. For example, the transformable canopy assembly 104 and/or components of the transformable canopy assembly 104 may be configured for any type of aircraft seat including, but not limited to, a business class or first-class passenger seat, an economy-class passenger seat, a pilot seat, or the like.

Although the disclosure has been described with reference to the embodiments illustrated in the attached drawing figures, equivalents may be employed, and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat comprising:
   a frame, wherein the frame includes a cavity defined by one or more surfaces of the frame;
   a seatback coupled to a seatback cushion, wherein at least a portion of the seatback fits within the cavity of the frame;
   a seat pan coupled to a seat pan cushion, wherein at least a portion of the seat pan fits within the cavity of the frame; and
   a transformable canopy assembly, wherein the transformable canopy assembly comprises:

one or more canopy mounts configured to couple the transformable canopy assembly to the frame;

a canopy sub-assembly configured to rotate between one of a stowed position and a deployed position, wherein the canopy sub-assembly comprises:

a canopy configured to provide one of lighting or sound mitigation when in the deployed position; and one or more canopy support members configured to support the canopy, wherein the one or more canopy support members are coupled to the canopy; and a canopy frame lock configured to couple the canopy sub-assembly to the frame, when in the stowed position, the canopy sub-assembly is secured to the frame via the canopy frame lock, wherein the canopy frame lock prevents the canopy sub-assembly from rotating to the deployed position, when in the deployed position, the canopy sub-assembly forms an arcuate-shaped cover over at least a portion of one of the seatback or the seat pan.

2. The aircraft seat of claim 1, wherein the arcuate-shaped cover formed by the canopy sub-assembly covers the seatback and the seat pan, wherein a user occupying the aircraft seat is entirely covered by the arcuate-shaped cover formed by the canopy sub-assembly.

3. The aircraft seat of claim 1, wherein the arcuate-shaped cover of the canopy sub-assembly covers the seatback, wherein a user when occupying the aircraft seat is at least partially covered by the arcuate-shaped cover formed by the canopy sub-assembly.

4. The aircraft seat of claim 1, wherein the one or more canopy mounts comprise at least one of:

one or more friction hinges or one or more torsion springs.

5. The aircraft seat of claim 1, wherein the canopy frame lock comprises at least one of:

one or more hook-and-loop fasteners, one or more solenoid locks, or one or more slide locks.

6. The aircraft seat of claim 1, wherein the canopy sub-assembly further comprises:

one or more canopy handles.

7. The aircraft seat of claim 6, wherein the one or more canopy handles are coupled to the one or more canopy support members and arranged on an interior surface of the canopy sub-assembly.

8. The aircraft seat of claim 1, further comprising:

a leg rest with foot support assembly configured to couple to a portion of the seat pan.

9. The aircraft seat of claim 1, wherein the aircraft seat is actuatable between one of an upright and lie-flat position.

* * * * *